United States Patent
Jaljal et al.

(10) Patent No.: US 11,679,887 B2
(45) Date of Patent: Jun. 20, 2023

(54) HYBRID PROPULSIVE ARCHITECTURE FOR AN AIRCRAFT COMPRISING AN ENGINE WITH A REVERSIBLE ELECTRIC MACHINE MOUNTED ON TWO SHAFTS

(71) Applicant: SAFRAN, Paris (FR)

(72) Inventors: Nawal Jaljal, Moissy-Cramayel (FR); Fabien Desarnaud, Moissy-Cramayel (FR)

(73) Assignee: SAFRAN, Paris (FR)

( * ) Notice: Subject to any disclaimer, the term of this patent is extended or adjusted under 35 U.S.C. 154(b) by 670 days.

(21) Appl. No.: 16/613,982

(22) PCT Filed: May 18, 2018

(86) PCT No.: PCT/FR2018/051202
§ 371 (c)(1),
(2) Date: Nov. 15, 2019

(87) PCT Pub. No.: WO2018/211227
PCT Pub. Date: Nov. 22, 2018

(65) Prior Publication Data
US 2021/0362862 A1    Nov. 25, 2021

(30) Foreign Application Priority Data

May 19, 2017 (FR) ..................................... 1754493

(51) Int. Cl.
*F02C 7/36* (2006.01)
*B64D 27/24* (2006.01)
(Continued)

(52) U.S. Cl.
CPC ............. *B64D 27/24* (2013.01); *B64D 31/00* (2013.01); *B64D 35/00* (2013.01); *F02C 6/20* (2013.01);
(Continued)

(58) Field of Classification Search
CPC ... F02C 7/36; F02C 3/113; F02C 6/20; B64D 2027/026; B64D 27/24; B64D 31/00; B64D 35/00; F05D 2220/323; F05D 2220/76
See application file for complete search history.

(56) References Cited

U.S. PATENT DOCUMENTS 5,694,765 A    12/1997 Hield et al.
5,867,979 A    2/1999  Newton et al.
(Continued)

FOREIGN PATENT DOCUMENTS

CA    2 903 986 A1    9/2014
EP    1 731 735 A2    12/2006
(Continued)

OTHER PUBLICATIONS

English translation of WO 2016/020618 A1, produced by Espacenet (Year: 2016).*
(Continued)

*Primary Examiner* — Thomas P Burke
(74) *Attorney, Agent, or Firm* — Oblon, McClelland, Maier & Neustadt, L.L.P.

(57) ABSTRACT

The aircraft motor architecture comprises two reversible electric machines (3, 4), the rotors (10) of which are linked both to the low pressure shaft (1) and to the high pressure shaft (2) by transmissions (11, 12, 13, 14) alternately disengaged depending on the direction of rotation of the rotor (10), the transmissions comprising passive one-way clutches (15, 16, 17, 18), the engagement directions of which are opposed. Independent modes of operation of the machines, as a starter or as an electric generator of each of the shafts, are thus provided.

9 Claims, 3 Drawing Sheets

Figure 1:
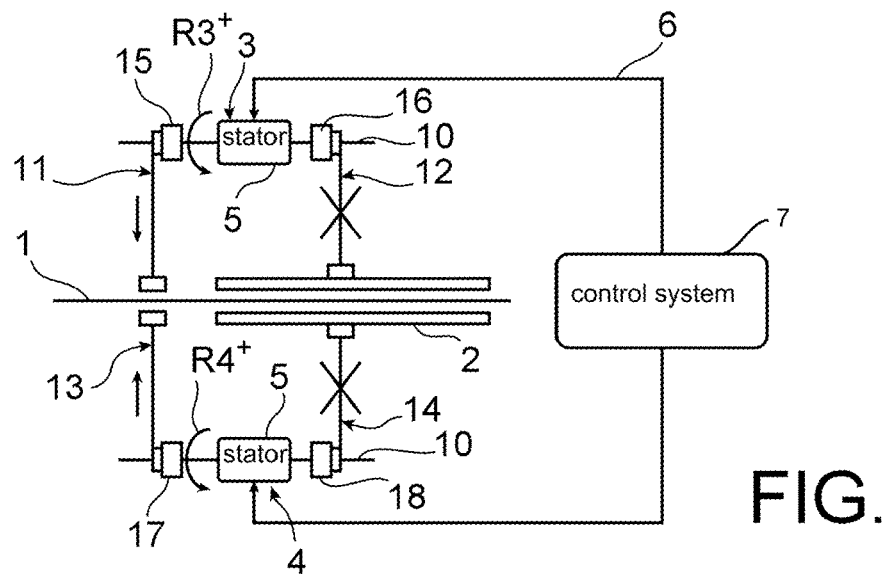

(51) Int. Cl.
  *B64D 31/00* (2006.01)
  *B64D 35/00* (2006.01)
  *F02C 6/20* (2006.01)
  *B64D 27/02* (2006.01)
(52) U.S. Cl.
  CPC .......... *F02C 7/36* (2013.01); *B64D 2027/026* (2013.01); *F05D 2220/323* (2013.01); *F05D 2220/76* (2013.01)

(56) References Cited

U.S. PATENT DOCUMENTS

| | | | |
|---|---|---|---|
| 2007/0101721 A1 | 5/2007 | Dooley et al. | |
| 2010/0133832 A1* | 6/2010 | Butt | B64C 11/48 290/46 |
| 2010/0327109 A1 | 12/2010 | Dooley et al. | |
| 2011/0154827 A1* | 6/2011 | Ress, Jr. | F02C 7/32 60/39.15 |
| 2013/0038057 A1 | 2/2013 | McLoughlin et al. | |
| 2013/0139518 A1* | 6/2013 | Morgan | F02C 3/10 60/773 |
| 2014/0290265 A1* | 10/2014 | Ullyott | F02C 3/113 60/773 |
| 2015/0274306 A1 | 10/2015 | Sheridan | |
| 2018/0202368 A1* | 7/2018 | Suciu | F02C 7/275 |
| 2018/0291807 A1* | 10/2018 | Dalal | F02K 5/00 |
| 2021/0039802 A1* | 2/2021 | Chesneau | F02K 3/06 |

FOREIGN PATENT DOCUMENTS

| | | |
|---|---|---|
| EP | 1 785 614 A2 | 5/2007 |
| EP | 2 1 92 291 A2 | 6/2010 |
| WO | WO 95/02120 A1 | 1/1995 |
| WO | WO 2016/020618 A1 | 2/2016 |
| WO | WO-2016020618 A1 * 2/2016 ............. F01D 15/10 |

OTHER PUBLICATIONS

International Search Report dated Sep. 10, 2018 in PCT/FR2018/051202 filed on May 18, 2018.
French Preliminary Search Report dated Jan. 25, 2018 in French Application 1754493 filed on May 19, 2017.

* cited by examiner

HYBRID PROPULSIVE ARCHITECTURE FOR AN AIRCRAFT COMPRISING AN ENGINE WITH A REVERSIBLE ELECTRIC MACHINE MOUNTED ON TWO SHAFTS

The invention relates to a hybrid propulsive architecture for an aircraft comprising an engine coupled with a reversible electric machine on its shafts.

The hybrid propulsive architectures for modern aircrafts include engines which are associated with electric machines connected by an electric distribution network to electric storing devices or other energy storing apparatuses. The engines can supply, in addition to the necessary energy for propulsion, electric energy exploited or stored elsewhere in the aircraft; the electric machines can also, reciprocally, supply a support energy to the engines, useful for certain phases of the ground and flight mission.

However, as the usual turbomachines comprise a low pressure shaft BP and a high pressure shaft HP rotating at different speeds, and the reversible power transmission can advantageously concern either of these shafts, we are led to associate each of the turbomachines with a particular electric machine, which can result in a heavy arrangement and which will prove complicated to be controlled in a reliable way.

The identified prior art comprises a large number of hybrid propulsion architectures where shafts and rotors of aircraft engines are associated with reversible electric machines: EP 2 192 291 A2 will first be mentioned, which could be the closest document to the invention, and comprises a single electric machine connected by respective one-way clutches to two shafts of the engine (here the low pressure shaft and a shaft associated with an end turbine of the engine and assigned to the driving of propellers), where the clutches are disposed so as to enable a start mode, in which the electric machine operates as a motor and drives the initially idle low pressure shaft, and a normal mode succeeding the start where the shaft for driving the propellers has reached a sufficient speed to couple the other one-way clutch, to operate the machine as an electricity generator, and uncouple the first clutch linking the machine to the low pressure shaft. It will be seen that the present invention also uses, among other things, a reversible electric machine coupled with two independent coaxial shafts of an aircraft engine by one-way clutches; but its architecture comprises other elements which enable completely different operating modes.

Other documents worth mentioning are WO 95/02120 A1, which describes three reversible electric machines respectively associated with the low pressure shaft, the high pressure shaft and a fan shaft by transmissions, among which a few comprise clutches, and which interact to transfer power from one of the shafts to the other, which however surely requires a complex control device, especially for the clutches; US 2013/0038057 A1 which describes a reversible electric machine which can be connected either to a propeller shaft, or to a low pressure shaft by respective clutches; US 2011/154827 A1 which describes a device where two concentric shafts of an aircraft engine are connected to reversible electric machines by gear drives; EP1731735 A2, a device where a high pressure shaft is further connected to a reversible electric machine and also connected, as well as the low pressure shaft, to an assembly comprising a hydraulic pump and a hydraulic motor, as well as a clutch, so as to transfer unlimited power from the low pressure shaft to the high pressure shaft, this device being nevertheless irreversible for the power transmission direction, and different from an electric machine for the reversible transformation of nature of energy; EP 1785614 A2 which describes, in an engine comprising two shafts with opposite directions of rotation, a device with an electric motor to drive a shaft and a fan separately for a taxiing motion; and U.S. Pat. No. 5,867,979 A, which further describes a device with three shafts each associated with a respective reversible electric machine, to enable energy transfers from one shaft to the other.

Such propulsive architectures thus enable a multitude of improved operating modes of aircraft engines with two to three shafts through reversible electric machines enabling power to be withdrawn from or supplied to the shafts. Controlling the different modes necessary for a universal operation of the engine, comprising numerous different modes, however implies the addition of clutches on the transmissions connecting the electric machines to the shafts or the machines to each other, with as a result a substantially heavier device and a risk of unreliability due to the presence of the control system.

The objective at the origin of the invention is therefore to look for a large number of various hybrid operating modes for aircraft engines, by having reversible electric machines associated with two coaxial shafts of the engine working together, but by using an as much as possible simple and light device which is perfectly reliable as regards the control of the clutches. The main means used to do so comprise the generalised utilisation of one-way clutches for the transmissions, the connection of the rotors of electric machines to each of both shafts, and the exploitation of the possibility to control the electric machines according to the four quadrants, that is in motor mode and in generator mode in both directions of rotation.

In a general form, the invention relates to an architecture of a hybrid propulsive system for an aircraft, comprising an engine comprising at least two shafts rotating independently of one another, the arrangement further comprising two reversible electric machines connected to a distribution network, characterised in that a rotor of each electric machine is connected to each of the engine shafts by a respective transmission, each of the transmissions comprising a disengaging coupling, the disengaging couplings are passive one-way clutches, and the one-way clutches of each electric machine have opposite disengagement directions of rotation, the shafts having either reversed directions of rotation, or identical directions of rotation, one of the transmissions then including a direction of rotation reversed, in that it comprises a system for controlling the electric machines enabling at least one of the shafts to be driven by both electric machines, and also enabling electricity to be generated from one of both shafts by the first electric machine, simultaneously to driving the second of both shafts by the second electric machine.

Moreover, according to a significant aspect of the invention enabling both a light and reliable system to be maintained, the disengaging couplings are one-way clutches and especially passive one-way clutches, such as overrunning clutches.

By exploiting the possible operation of an electric machine according to the four operating quadrants, a transmission by only one of both shafts along the direction of rotation of the rotor of the machine is obtained if the one-way clutches disengage for opposite directions of rotation of the rotor, since the coupling of one of the transmissions implies the uncoupling of the other. No damage caused by an operating accident is therefore to be feared. This result is immediately obtained with the engine shafts that do not rotate in the same direction of rotation, such as counterrotating shafts. Otherwise, it will be necessary to add a rotation reverser, such as a gear or any usual device, to one of the transmissions. As one-way clutches are passive devices, no device for controlling the clutches is necessary.

As the implementations of the invention imply a pair of electric machines per engine, the interest is to allow original operating modes, especially consisting in transferring power from one shaft to the other, a withdrawal on one of them by a first one of the electric machines coinciding with the power supply to the other shaft by the other electric machine.

Other operating modes of the arrangement of the invention are possible, and their advantages and conditions of use will be detailed later. According to certain improvements that can be brought to the general design of the invention, the control system enables electricity to be generated from one of the shafts by one or both electric machines; the transmissions comprise unequal rotating speed reducing ratios between the rotor of at least one of the machines and the shafts of the engine; the electric machines of all the engines are connected to an energy supply device.

The different implementations of the invention, comprising two electric machines connected to both shafts of the engine, therefore offer various advantages. It becomes possible to adjust the mechanical power withdrawals or on the contrary the additional power supply to the engine with a great freedom and in a way much more adapted to the different situations encountered during the whole flight and ground mission, with the perspective of increasing the performance of the engine at different loads, or on the contrary to withdraw more mechanical power, without a drawback for the global performance of the engine and its operability. The possibilities of increasing the transient performance, or of assisting the engine during the flight and ground start phases will in particular be mentioned. Another favourable consequence for the global performance of the aircraft will be a greater freedom in the turbomachine dimensioning, considering that there will always be, in a sure way, an available power supplement coming from another energy supply device, which can be assigned thanks to the engine mode of the electric machines to the shaft in need thereof. The independent coupling of the electric machines on both shafts further enables innovating operating modes for modern aircrafts with the electric spin-up or power assist by acceleration or braking of the BP and/or HP shafts, with the engine turned off or in operation. The supply of the electric power to the electric machines of an engine may come from another engine or an energy storing device, provided to do so or for example associated with a turbogenerator.

The characteristic architecture of the invention is otherwise simple, reliable and light thanks to the choice of one-way couplings which do not require control means.

And the invention can be implemented on each of the engines of a same aircraft, with a common energy supply device for the different electric machines, also able to supply power to the pieces of equipment and services of the aircraft.

Figure 5:
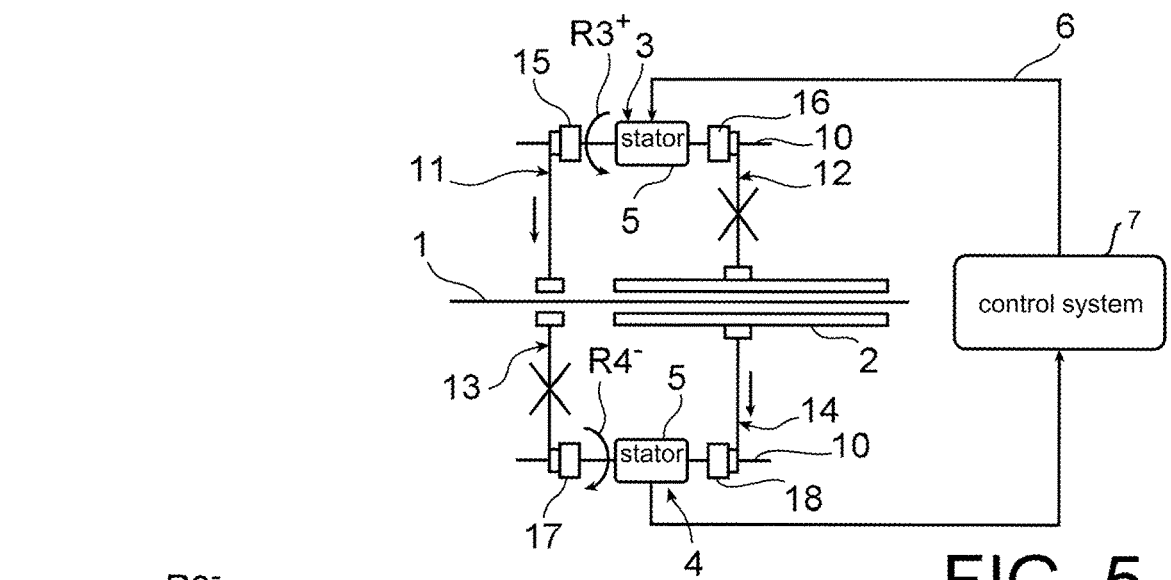
Figure 6:
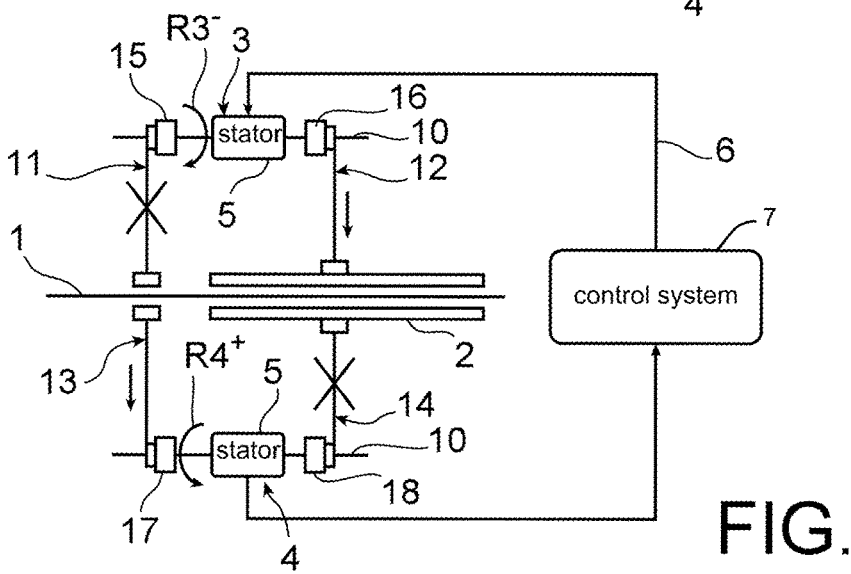
Figure 7:
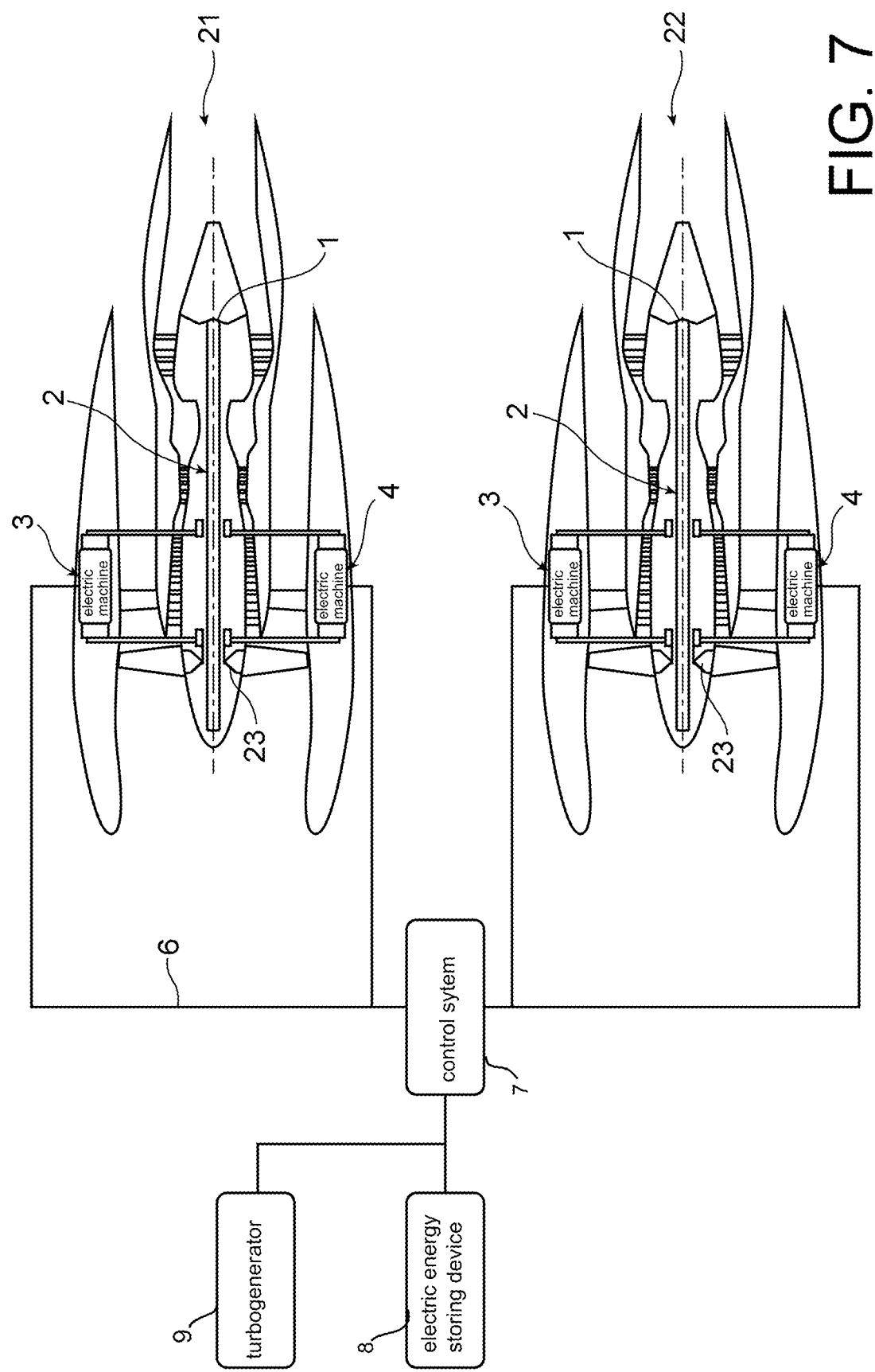

Different aspects, characteristics and advantages of the invention will be now described in relation to the following figures, which depict in a detailed way a purely illustrative implementation thereof:

FIGS. 1 to 6 show an implementation of the invention and its different operating modes, and FIG. 7 shows the complete arrangement disposed on an aircraft.

The description is first about FIGS. 1 and 7. An aircraft engine comprises a low pressure shaft 1 and a high pressure shaft 2 which are coaxial and concentric, as is usual. It is associated with two reversible electric machines 3 and 4 each of which comprises a stator 5 connected by electric cables from a distribution network 6 to a control system 7, and through the latter to a battery or another electric energy storing device 8. FIG. 7 shows that the control system 7 is connected to all the electric machines characterising the invention, which is here advantageously applied to each of both engines 21 and 22 of the aircraft. The control system 7 interacts with the power electronics necessary to control the electric machines 3 and 4. The architecture can also have a turbogenerator 9 which supplies among other things, the electric distribution network 6 and/or an energy storing device as systems of batteries.

The electric machines 3 and 4 each comprise a rotor 10, which is connected to each of the low pressure 1 and high pressure 2 shafts by a transmission, respectively 11 and 12 for the electric machine 3 and 13 and 14 for the electric machine 4. Each of the transmissions 11, 12, 13 and 14 comprises actual transmission elements such as rotor elements, intermediate shafts, gears, etc., of any types and also a one-way coupling, respectively 15, 16, 17 and 18, that can advantageously be a passive element as a coupling with an overrunning clutch. The one-way couplings 15 to 18 can be directly mounted on the rotors 10 as shown here, or elsewhere on the transmissions 11 to 14.

It is essential to notice that the coupling directions of the overrunning clutches 15 and 16 are opposite, in the same way as those of the overrunning clutches 17 and 18, resulting in each of the rotors 10 being coupled with either of the low pressure 1 and high pressure 2 shafts, through either of the transmissions 11 and 12, or 13 and 14, and only one of them, according to its direction of rotation.

The different possible operating modes, governed by the control system 7, will now be detailed. These operating modes are chosen and set by the control system 7, which acts on the controls of the electric machines 3 and 4 and the check of the engine; the one-way couplings 15 to 18 do not need any control mechanism if they are passive, which is a considerable advantage increasing the reliability of the architecture.

The embodiment of FIG. 1 is an embodiment where the rotors 10 of both electric machines 3 and 4 rotate in a direction of rotation which will be denoted positive (R3+ and R4+) which induces the coupling of the overrunning clutches 15 and 17. The engagement of both rotors 10 and of the low pressure shaft 1 is made by the transmissions 11 and 13. Moreover, the energy storing device 8 supplies the necessary electric power to the electric machines 3 and 4. This situation may correspond to a turned off engine 21 or 22 and to the taxiing mode or ground driving mode by a propeller or a fan 23 (FIG. 7) at the end of the low pressure shaft 1, or to the transient or continuous additional power supply exclusively on the low pressure shaft 1, which can be established during the different flight phases. In this operating mode as in all those where the electric machines 3 and 4 (or only one of them) work in engine mode, the electric energy which supplies them may also come from other pieces of equipment which are connected to them by the distribution network 6, as from the turbogenerator 9 or the other of the engines 22 or 21, by the electric machines 3 and 4 of the latter. The invention can therefore allow operating modes where one of the engines starts or accelerates the other, which is particularly appreciated in case of failure, the turned off engine then continuing operating through its low pressure shaft 1, which here further drives a propeller or the fan 23.

Figure 2:
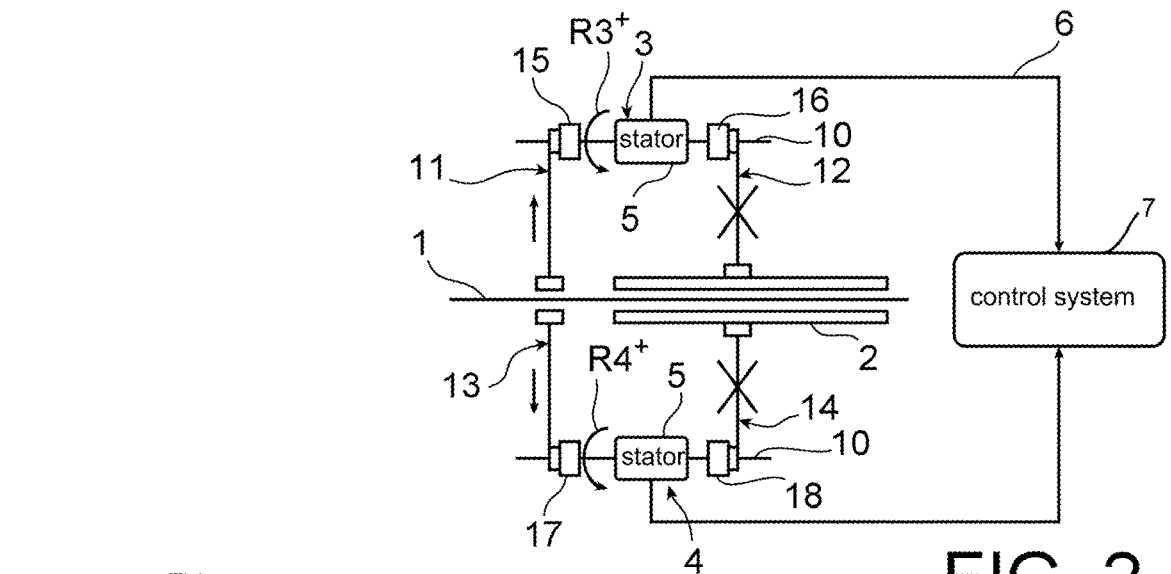

The embodiment of FIG. 2 is similar to the one of FIG. 1 and is especially based on the rotation of both rotors 10 in the positive direction R3+ and R4+, except that the electric machines 3 and 4 both work as an electric power generator thanks to their power electronics. This mode enables the mechanical power to be withdrawn from the low pressure shaft 1 to supply non-propulsive energy, charge the energy storing device 8 or brake the low pressure shaft 1.

Figure 3:
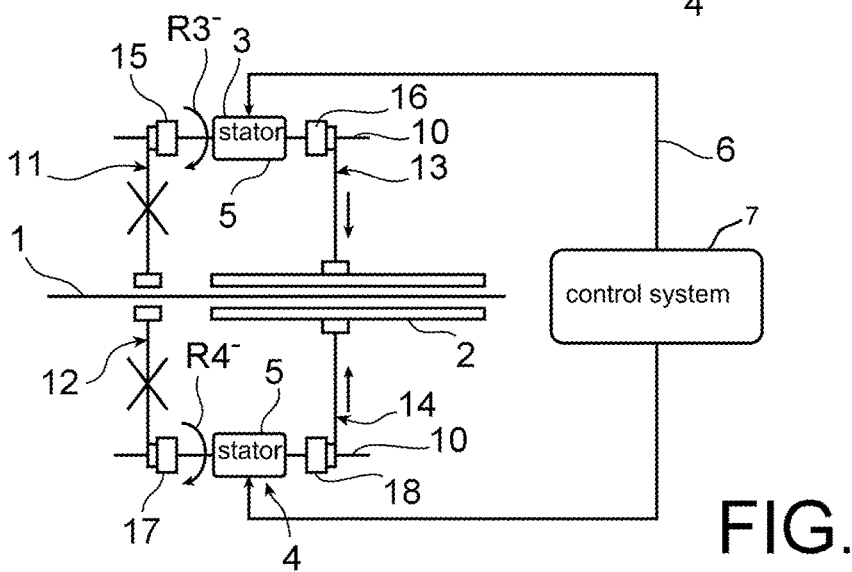
Figure 4:
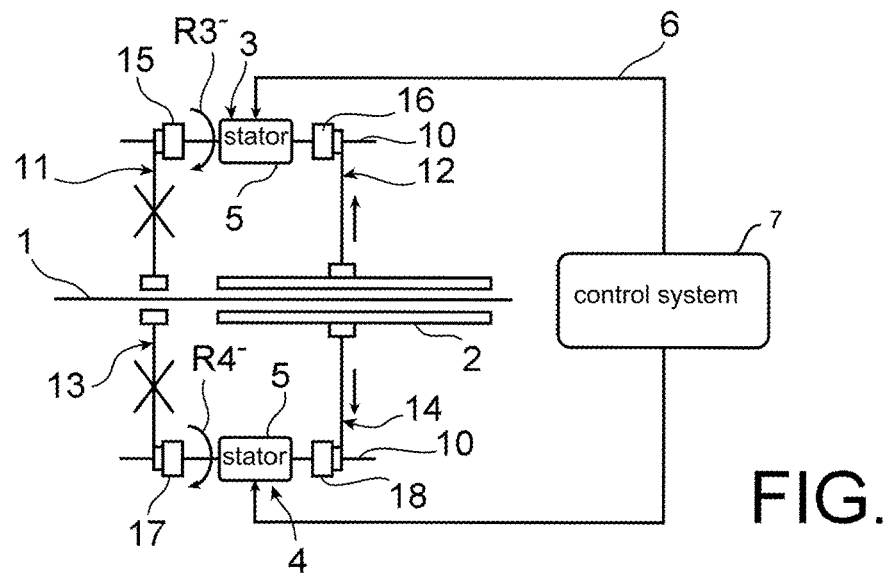

The embodiment of FIG. 3 can be distinguished from the previous embodiments by a reverse of the directions of rotation of the rotors 10, that is they rotate in the so-called negative directions R3– and R4–. The transmissions 11 and 13 leading to the low pressure shaft 1 then become inactive, and reciprocally the transmissions 12 and 14 leading to the high pressure shaft 2 transmit power. In this embodiment, power is supplied by the energy storing device 8, or the turbogenerator 9, or the second engine 22 or 21 to the high pressure shaft 2 by both electric machines 3 and 4. That can be used for starting the engine 21 or 22 or a transient or continuous power assist of the high pressure shaft 2, which can be established during the different flight phases. Here also, the presence of both electric machines 3 and 4 that can be independently controlled offers a greater design freedom.

In the embodiment of FIG. 4, there are again the same negative directions of rotation R3– and R4– of the rotors 10, but the power transmission direction is reversed, that is the electric machines 3 and 4 work in generator mode. This operating mode could be usual to supply non-propulsive energy, charge the energy storing device 8 or brake the high pressure shaft 2.

In the operating mode of FIG. 5, the rotation in the positive direction R3+ of the first electric machine 3 is associated with the negative direction of rotation R4– of the second electric machine 4. It is then possible to withdraw the mechanical power from one of the shafts and to supply the mechanical power to the other, with an electric power supply or draining balance on the distribution network 6 that can be zero. Here, the first electric machine 3 helps to drive the low pressure shaft 1 by the transmission 11, and the high pressure shaft 2 operates the second electric machine 4 in electricity generator mode. Such an operating mode can be of interest for example in the transient phases of the engine 21 or 22, by accelerating the low pressure shaft 1 and decelerating the high pressure shaft 2.

FIG. 6 shows that the opposite operation is possible, the first electric machine 3 supplying energy to the high pressure shaft 2, with the negative direction of rotation R3–, and the low pressure shaft 1 operating the second electric machine 4 as a generator by means of rotating its rotor 10 in the positive direction R4+. Such an operating mode can be of interest for example in the transient phases of the engine 21 or 22, by accelerating the high pressure shaft 2 and decelerating the low pressure shaft 1.

Switching between the different operating modes can be made easier, as well as the dimensioning of the electric machines 3 and 4, if the reducing ratios of the transmissions 11 and 12, and 13 and 14 leading to each of the rotors 10 are unequal, so that the load intervals of the low pressure shaft 1 and of the high pressure shaft 2 correspond to speed intervals close on the rotor 10 to each of the electric machines 3 and 4, which can be obtained by rotation amplifiers or reducers (not shown, which can consist of gears) on the transmissions 11 to 14 of each of the electric machines 3 and 4.

The invention claimed is:

1. An architecture of a hybrid propulsive system for an aircraft, comprising an engine comprising at least two shafts rotating independently of one another, two reversible electric machines connected to a distribution network, and a control system for the two reversible electric machines, wherein:
   a rotor of each of the two reversible electric machines is respectively connected to each of the at least two shafts by a respective transmission, the at least two shafts rotating independently have either reversed directions of rotation, or identical directions of rotation, one of the transmissions then including a direction of rotation reversed,
   each of the transmissions comprising a disengaging coupling,
   wherein the disengaging couplings are passive one-way clutches, and the passive one-way clutches of each reversible electric machine couple the rotor of a respective reversible electric machine with a respective and single one of the at least two shafts for opposite directions of rotation of the rotor of the respective reversible electric machine,
   the control system for the two reversible electric machines enables:
   a control of the two reversible electric machines in a motor mode and in a generator mode in both directions of rotation of their rotor,
   a driving of at least one of the at least two shafts by both reversible electric machines, and also a generation of electricity from one of the at least two shafts by a first reversible electric machine, simultaneously to driving another of both shafts by a second reversible electric machine.

2. The architecture of a hybrid propulsive system for an aircraft according to claim 1, wherein the control system enables electricity to be generated from one of the at least two shafts, by at least one of the two reversible electric machines.

3. The architecture of a hybrid propulsive system for an aircraft according to claim 1, wherein the transmissions comprise unequal rotating speed reducing ratios between the rotor of at least one of the two reversible machines and the at least two shafts of the engine.

4. An aircraft, comprising:
   a plurality of engines each being provided with an architecture for a hybrid propulsion and comprising at least two shafts rotating independently of one another, the architecture further comprising two reversible electric machines connected to a distribution network, wherein a rotor of each reversible electric machine is respectively connected to each of the at least two shafts by a respective transmission,
   each of the transmissions comprising a disengaging coupling, the disengaging couplings are passive one-way clutches, and the passive one-way clutches of each reversible electric machine couple the rotor of a respective reversible electric machine with a respective and single one of the at least two shafts for opposite directions of rotation of the rotor of the respective reversible electric machine,
   the at least two shafts rotating independently have either reversed directions of rotation, or identical directions of rotation, one of the transmissions then including a direction of rotation reversed,
   and further comprising a system for controlling the two reversible electric machines in a motor mode and in a generator mode in both directions of rotation of their rotor, the system further enabling at least one of the at least two shafts to be driven by both reversible electric machines, and also enabling electricity to be generated from one of the at least two shafts by a first reversible electric machine, simultaneously to driving another of the at least two shafts by a second reversible electric machine, and the two reversible electric machines of each of the plurality of engines are connected to an energy supplying device.

5. The aircraft according to claim 4, further comprising a control system enabling a first one of the engines to be driven by another one of the engines via the two reversible electric machines, the two reversible electric machines of the first one of the engines operating in an engine mode and the two reversible electric machines of another one of the engines operating in a generator mode.

6. The aircraft according to claim 4, further comprising an energy supplying device, connected to the two reversible electric machines, and which comprises a turbogenerator and/or an energy storing device.

7. An architecture of a hybrid propulsive system for an aircraft, comprising an engine comprising a low pressure shaft and a high pressure shaft rotating independently of one another, two reversible electric machines connected to a distribution network, and a control system for the two reversible electric machines, wherein:
- a rotor of each of the two reversible electric machines is connected to the low pressure shaft and to the high pressure shaft by a respective transmission,
- each of the transmissions comprising a disengaging coupling,
- wherein the disengaging couplings are passive one-way clutches, and the passive one-way clutches of each of the two reversible electric machines couple the rotor of a respective reversible electric machine with a respective and single one of the low pressure shaft and the high pressure shaft for opposite directions of rotation of the rotor of the respective reversible electric machine,
- the control system for the two reversible electric machines enables:
- a control of the two reversible electric machines in a motor mode and in a generator mode in both directions of rotation of their rotor,
- a driving of at least one of the low pressure shaft and high pressure shaft by both reversible electric machines, and also a generation of electricity from one of the low pressure shaft and the high pressure shaft by a first reversible electric machine, simultaneously to driving another of the low pressure shaft and the high pressure shaft by a second reversible electric machine.

8. The architecture of a hybrid propulsive system for an aircraft according to claim 7, wherein the control system enables electricity to be generated from one of the low pressure shaft and high pressure shaft, by one or two reversible electric machines.

9. The architecture of a hybrid propulsive system for an aircraft according to claim 7, wherein the transmissions comprise unequal rotating speed reducing ratios between the rotor of at least one of the two reversible electric machines and the low pressure shaft and the high pressure shaft of the engine.

* * * * *